A. MEINERS.
FISHING TACKLE.
APPLICATION FILED JULY 7, 1914. RENEWED SEPT. 21, 1915.
1,175,968.
Patented Mar. 21, 1916.
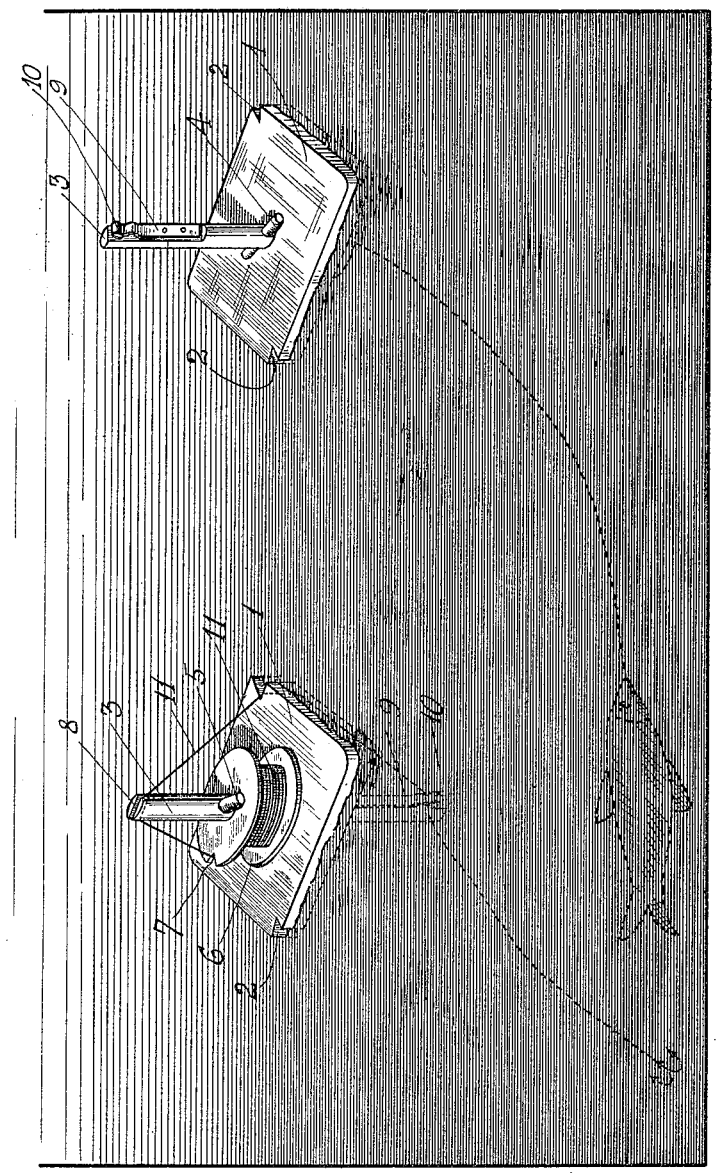
WITNESSES:
Fred Roeger
Aladar Hamburger
INVENTOR.
August Meiners
BY Alexander Ferres
ATTORNEY.

UNITED STATES PATENT OFFICE.

AUGUST MEINERS, OF NEW YORK, N. Y.

FISHING-TACKLE.

1,175,968. Specification of Letters Patent. Patented Mar. 21, 1916.

Application filed July 7, 1914, Serial No. 849,431. Renewed September 21, 1915. Serial No. 51,906.

*To all whom it may concern:*

Be it known that I, AUGUST MEINERS, a subject of the Emperor of Germany, and resident of New York, in the county of the Bronx and State of New York, have invented new and useful Improvements in Fishing-Tackle, of which the following is a specification.

My invention relates to a fishing tackle and has as its principal object to provide a device of this kind which forcibly and automatically declares the capture of fish in the moment such capture occurs.

A further object of my invention is to provide a device of the character described a comparatively large number of which can be handled simultaneously by one person, the capture of the fish being easily detectable from a considerable distance and requiring the slightest degree of vigilance.

A final object of my invention resides in the particular arrangement and combination of parts hereinafter described.

In the accompanying drawing: Figure 1 is a perspective view of the device, as set for the capture of fish. Fig. 2 is a perspective view of the device in the position which it occupies after the capture of the fish. Both figures show the tackle floating on the surface of water, the parts below the surface of the water being indicated by dotted lines.

Throughout the different views the same part is designated by the same reference character.

Referring more particularly to the drawing, 1 denotes a plate made of wood or other suitable material of like buoyancy, preferably of the shape shown in the drawing, having one or more grooves such as 2 cut in the corner edges of same, through its whole thickness. A shaft 3 is journaled into the plate 1 at the center thereof and secured therein by a pin 4 underneath the plate 1 and a pin 5 in the top part of the shaft 3, a spool 6 being inserted between the plate 1 and the pin 5, rotatably mounted on the shaft 3. The spool 6 has a groove 7 at one part of the upper rim of same. A slot 8 is worked into the top of the shaft 3. A clip 9 is fastened to the lower end of the shaft 3, the lower end of the clip 9 being rounded and at a little distance therefrom a buckle 10 is formed by the clip 9 so as to admit of a string freely running in the said buckle. One end of a string 11 is fastened to the spool 6 and wound several times around same. Thereafter the string 11 is passed in succession through the groove 7, through the slot 8, through the groove 2 and finally under the end of the clip 9 into the buckle 10. The free end of the string 11 trails in the water and a hook 12 is fastened to its end with some bait attached to it. I may also provide further similar hooks along the part of the string trailing in the water.

The bottom parts of the tackle are painted red and the top parts white. The former color is one not easily detected by the fish and the latter serves to the person using the tackle to keep them well before his eyes. Now, when the fish swallow the bait and with it the hook, the tackle is automatically and forcibly upset by the violent tugging of the fish at the string and the red color of the bottom parts of the tackle appears on the surface of the water, which is a sure sign of the fish being caught, because if the fish only nip at the bait the tackle will not thereby be upset. The person using the tackle may set out and watch about a dozen of same simultaneously, following them in a boat and whenever any particular tackle is upset he only has to grab it with a boat hook and then draw in the line with the fish on the hook. Sufficient of the string must be coiled up on the spool to allow the fish to swallow the bait easily without feeling any resistance from the tackle so that the fish may not notice that the bait is attached to anything.

While I have thus shown and described the preferred form of my invention, it is understood that I do not wish to be limited to the same but contemplate such modifications as are equivalent in their effect to the form shown and described herein, without departing from the principles above set forth.

Having thus fully shown and described my invention, what I claim is:

A fishing tackle comprising, in combination, a plate painted in different colors at the top and at the bottom, a shaft passing through the center of said plate, a spool rotatably mounted on said shaft, a string wound around said spool and carried over the top of said shaft and the edge of the said plate under a clip at the lower end of the shaft and a hook or hooks attached to the end of said string, trailing in the water.

In testimony whereof, I have hereunto affixed my signature in the presence of two witnesses.

AUGUST MEINERS.

Witnesses:
ALEXANDER DENES,
ABARDAR HAMBURGER.

Copies of this patent may be obtained for five cents each, by addressing the "Commissioner of Patents, Washington, D. C."